US009889709B2

(12) United States Patent
Marui (10) Patent No.: US 9,889,709 B2
(45) Date of Patent: Feb. 13, 2018

(54) TIRE WITH KNOBS

(71) Applicant: Shinji Marui, Kobe (JP)

(72) Inventor: Shinji Marui, Kobe (JP)

(*) Notice: Subject to any disclaimer, the term of this patent is extended or adjusted under 35 U.S.C. 154(b) by 621 days.

(21) Appl. No.: 14/103,624

(22) Filed: Dec. 11, 2013

(65) Prior Publication Data
US 2015/0158339 A1   Jun. 11, 2015

(51) Int. Cl.
*B60C 11/11*   (2006.01)
*B60C 11/03*   (2006.01)
*B60C 11/13*   (2006.01)

(52) U.S. Cl.
CPC ......... *B60C 11/0311* (2013.01); *B60C 11/032* (2013.01); *B60C 11/0327* (2013.01); *B60C 11/11* (2013.01); *B60C 2011/1361* (2013.01); *B60C 2200/12* (2013.01)

(58) Field of Classification Search
CPC ............... B60C 11/032; B60C 11/0306; B60C 2200/12; B60C 11/0323; B60C 13/001; B60C 2011/1361
USPC ..................................... 152/209.19
See application file for complete search history.

(56) References Cited

U.S. PATENT DOCUMENTS

| 5,924,464 A * | 7/1999 | White | B60C 11/0306 |
| | | | 152/209.17 |
| 6,386,253 B1 * | 5/2002 | Marriott | B60C 11/0306 |
| | | | 152/209.15 |
| 2003/0111150 A1 * | 6/2003 | Zimmer | B60C 11/00 |
| | | | 152/209.19 |
| 2009/0218019 A1 * | 9/2009 | Paturle | B29C 33/424 |
| | | | 152/209.18 |
| 2010/0139826 A1 * | 6/2010 | Matsumoto | B60C 11/0309 |
| | | | 152/209.18 |
| 2012/0112430 A1 * | 5/2012 | Shaw | B60C 27/06 |
| | | | 280/288.4 |
| 2013/0112326 A1 * | 5/2013 | Mellara | B60C 11/13 |
| | | | 152/209.19 |

FOREIGN PATENT DOCUMENTS

| CN | 202200783 U | 4/2012 |
| CN | 202294097 U | 7/2012 |
| EP | 2338700 A1 | 6/2011 |
| EP | 2662227 A1 | 11/2013 |

(Continued)

OTHER PUBLICATIONS

English machine translation of EP2662227, no date.*

(Continued)

*Primary Examiner* — Robert C Dye
(74) *Attorney, Agent, or Firm* — Innovation Capital Law Group, LLP; Vic Lin (57) ABSTRACT

A tire includes knobs that are small in relation to the size of the tire. The knobs are closely positioned together in groups and may be disposed in recesses to lower the tops of the knobs relative to the circumferential outer surface of the tire. The recesses may comprise a variety of shapes and designs. The knobs may have varying lengths, widths, heights and shapes. The knobs may also be grouped to form letters, numerals, symbols and graphic images. The size of the knobs and distance of spacing between adjacent knobs may be proportionally small in relation to the tire's width, diameter, circumference, or ridable surface area.

23 Claims, 5 Drawing Sheets

(56) References Cited

FOREIGN PATENT DOCUMENTS

| FR | 982205 A | | 6/1951 |
|---|---|---|---|
| JP | H10-244813 | * | 9/1998 |
| JP | 2003054220 A | | 2/2003 |
| JP | 2005047335 | * | 2/2005 |
| JP | 2006151233 | * | 6/2006 |
| JP | 2006-327245 | * | 12/2006 |
| TW | M372793 | | 1/2010 |
| WO | 2012171802 A1 | | 12/2012 |
| WO | 2013089865 A1 | | 6/2013 |

OTHER PUBLICATIONS

English machine translation of JP2006-151233, dated Jun. 2006.*
English machine translation of JPH10-244813, dated Sep. 1998.*
English machine translation of JP2005-047335, dated Feb. 2005.*
English machine translation of JP2006-327245, dated Dec. 2006.*
European Search Report (dated May 4, 2015) for European Patent Application No. 14159483.8, filed Mar. 13, 2014.
Office Action dated Jun. 13, 2016 from corresponding Taiwan Patent Application No. 103109310.

* cited by examiner

TIRE WITH KNOBS

BACKGROUND OF THE INVENTION

1. Field of the Invention

The invention relates generally to tires for bicycles and vehicles.

2. Description of Prior Art and Related Information

Tire treads provide grip by generating friction with the ground surface. Too little friction may enable ease of riding with less resistance, such as with a road bicycle, but provide insufficient traction for certain terrains and road conditions. Therefore, a need exists to improve tire friction.

BRIEF SUMMARY OF THE INVENTION

In accordance with the present invention, structures and associated methods are disclosed which address these needs and overcome the deficiencies of the prior art.

In one aspect, a tire comprises a first knob and a second knob. The first knob has a first knob length and first knob width. At least one of the first knob length and first knob width is less than 2 mm. The second knob has a second knob length and a second knob width. At least one of the second knob length and second knob width is less than 2 mm. The first and second knobs are positioned no more than a distance of 2 mm from each other.

The first knob and second knob may be preferably disposed in a recess including a recess base and a recess sidewall with a top ledge. The recess defines a depth extending from the base to the ledge. The first knob has a first top surface that may protrude beyond the ledge, be substantially flush with the ledge, or lie beneath the ledge. The second knob has a second top surface that may protrude beyond the ledge, be substantially flush with the ledge, or lie beneath the ledge. The top surfaces of the first and second knobs may have similar or different heights. The first and second knobs may be positioned against or away from the recess wall.

The tire may further comprise a groove in fluid communication with the recess that is configured to capture and direct liquid away from the recess.

The first knob may be attached to, or separate from, the second knob.

The tire further comprises a tire width. In an embodiment, the first knob preferably has a first cross-dimension less than 5% of the tire width, and the second knob preferably has a second cross-dimension less than 5% of the tire width.

The tire further comprises a tire circumference. In an embodiment, the first knob preferably has a first cross-dimension less than 0.15% of the tire circumference, and the second knob preferably has a second cross-dimension less than 0.15% of the tire circumference.

In a further aspect, a tire comprises a tire width and a recess having a recess base and a recess sidewall. A first knob is disposed in the recess. The first knob has a first knob width and a first knob length. At least one of the first knob width and first knob length is preferably less than 5% of the tire width.

The tire further may comprise a groove in fluid communication with the recess that is configured to capture and direct liquid away from the recess.

The tire further comprises a second knob disposed in the recess. The second knob comprises a second knob width and a second knob length. The first and second knobs are preferably positioned no more than a distance of 5% of the tire width from each other.

The first knob may attached to, or separate from, the second knob.

The first knob preferably has a first cross-dimension less than 2 mm. The second knob preferably has a second cross-dimension less than 2 mm.

The tire further comprises a tire circumference. One of the first knob length and first knob width is preferably less than 0.15% of the tire circumference. One of the second knob length and second knob width is preferably less than 0.15% of the tire circumference.

In a further aspect, a tire comprises a tire circumference, a first knob and a second knob, wherein the first and second knobs are preferably positioned no more than a distance 0.12% of the tire circumference from each other. The first knob has a first knob length and a first knob width. At least one of the first knob length and the first knob width is preferably less than 0.15% of the tire circumference. The second knob has a second knob length and a second knob length. At least one of the second knob length and the second knob width is preferably less than 0.15% of the tire circumference, The first knob and second knob are preferably disposed in a recess comprising a base and a recess wall with a ledge. The recess defines a depth extending from the base to the ledge.

The may further comprise a groove in fluid communication with the recess that is configured to capture and direct liquid away from the recess.

The first knob may be attached to, or separate from, the second knob.

At least one of the first knob length and first knob width is preferably less than 2 mm. At least one of the second knob length and second knob width is preferably less than 2 mm.

The tire further comprises a tire width. At least one of the first knob length and first knob width is preferably less than 5% of the tire width. At least one of the first knob length and first knob width is preferably less than 5% of the tire width.

In a further aspect, a tire comprises an outer circumference, a tire width, a first knob and a second knob. The first knob has a first length less than 2.5 mm and a first width less than 2.5 mm. The second knob has a second length less than 2.5 mm and a second width less than 2.5 mm. Each knob preferably has a height greater than 0.4 mm. The first and second knobs are positioned no more than a distance 0.12% of the tire circumference from each other. The first knob and second knob are preferably disposed in a recess including a recess base and a recess wall with a ledge. The recess defines a depth extending from the base to a circumferential surface of an adjacent tire portion. The tire may further comprise a groove in fluid communication with the recess that is configured to capture and direct liquid away from the recess.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

Figure 1:
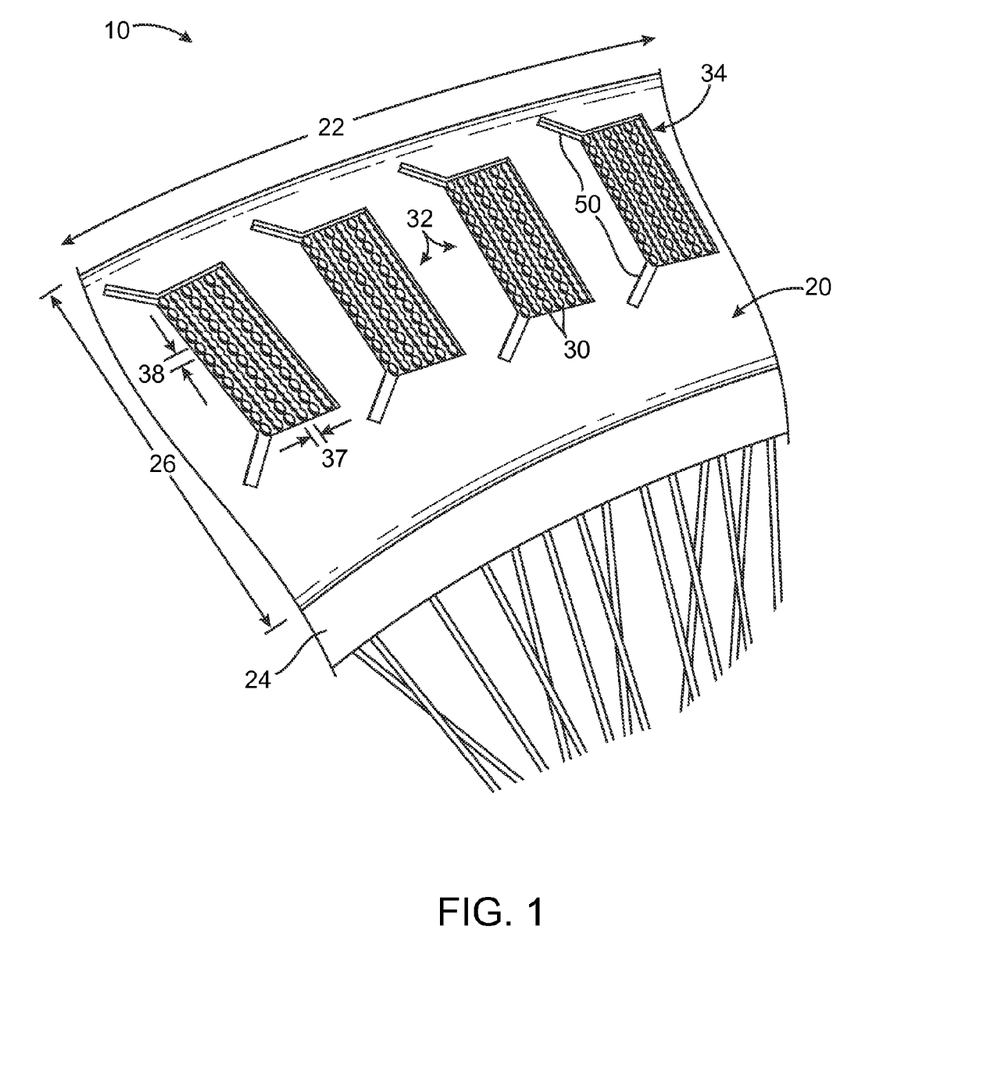
FIG. 1 is a perspective view of a first preferred embodiment of a tire.

A first preferred embodiment of a tire is illustrated in FIG. 1 and designated generally by the reference numeral 10. The tire 10 may be configured for use with bicycles, scooters, motorcycles, automobiles, trucks, tractors and any other ground vehicle or toy requiring tires.

In FIG. 1, the tire 10 comprises an outer circumferential surface, or simply outer surface, 20 that is configured to touch the ground surface. The total surface area of the outer surface 20 defines a "ridable" surface area, which may also be considered the product of the outer circumferential surface times the tire width. The outer surface 20 defines a tire circumference 22. A pair of sidewalls 24 extend radially inward from the outer surface 20. The tire 10 also defines a tire width 26 between the sidewalls 24, as shown in FIG. 1, and a circumference 22 and diameter 28, as shown in FIG. 3.

The tire 10 comprises tire knobs, or simply knobs, 30 extending radially outward from the outer surface 20 in circumference. The tire 10 preferably comprises knob groups 32 where each group 32 includes a plurality of closely positioned knobs 30. In the preferred embodiment, the size of each tire knob 30 is substantially small relative to the size of the tire. Additionally, the distance of spacing between adjacent knobs 30 is preferably small relative to the size of the tire.

Figure 2:
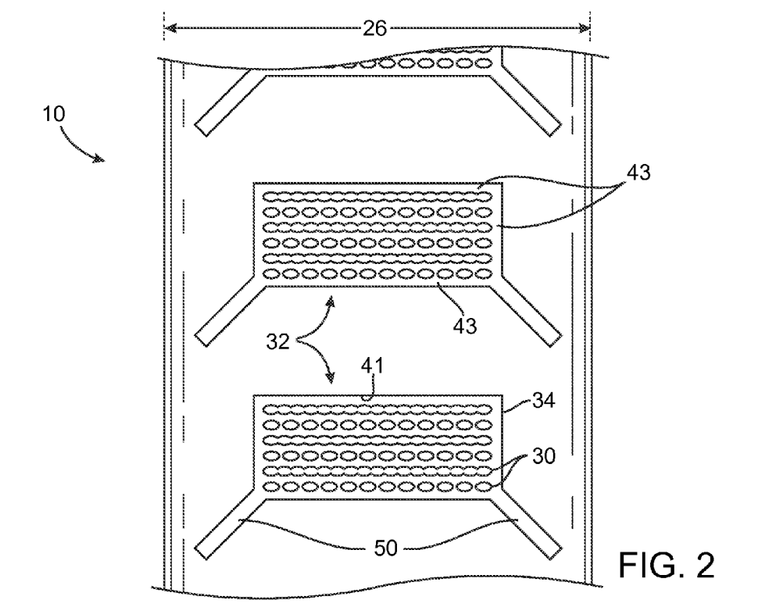
FIG. 2 is a top plan view of the first preferred embodiment of the tire.
Figure 3:
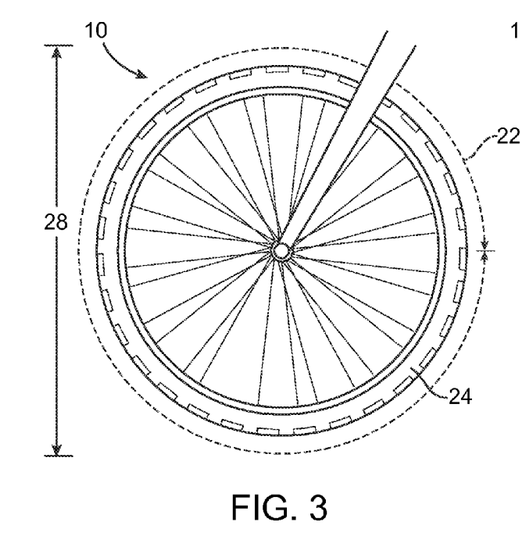
FIG. 3 is a side elevation view of the first preferred embodiment of the tire.

FIGS. 1-3 show a preferred tire 10 for use in connection with bicycles. In such an embodiment, the preferred knobs 10 resemble bristles due to their substantially small lengths and widths relative to the size of the tire 10. The knobs 30 also resemble bristles in that a plurality of knobs 30 are closely positioned together and being separated, if at all, by a substantially small distance of spacing between adjacent knobs 30. The specific dimensions of the knobs 30 and their arrangement and placement significantly manage the effects of hysteresis.

In the preferred embodiment, each knob group 32 may be disposed, or contained, within an optional tire recess 34 that lowers or indents the tops of the knobs 30 radially inward relative to the tire outer surface 20 along the major diameter. Therefore, the knobs 30 extend to a height less than they would without the recess 34. In the preferred embodiment as shown in FIG. 2, a plurality of knobs 30 substantially fill out the enclosed recess 34, leaving a minor gap 43 between the recess wall, or boundary, 41 and adjacent knobs 30 on the perimeter of the group 32.

In the preferred embodiment, each recess 34 comprises a space indented into the tire outer surface 20 and bordered by a boundary, or recess perimeter 36, that preferably forms a closed loop. The recesses 34 collectively define a minority of the surface area of the ridable surface area such that the surrounding raised tire portions collectively define a majority of the ridable surface area. In some instances, the recess 34 acts as a threshold limiting the knobs' 30 exposure to the ground surface. Without the recess, the knobs 30 would be fully exposed to the ground surface and easily subjected to wear and/or breakage in certain placements due to the size of the knobs. The recess "protects" knobs 30 therein and artificially limits their exposure to the surface. Effects of hysteresis may be better managed by altering the level of the knobs' 30 surface exposure by differing sizes of recess (area and/or depth) matched to differing sizes/arrangements of knobs 30 (below, above, or even with walls of recess).

It will be appreciated that employing recesses 34 disposes the knobs 30 radially inwardly with respect to the raised majority tire portions, thereby reducing resistance when rolling without compromising traction. Resistance is reduced by not having the full height of the knobs 30 protrude beyond the circumferential outer surface 20 of the tire which would otherwise enable greater deformity of the knobs when compressed against the ground.

Each knob 30 defines a length 37 and width 38. Each knob also defines a height 39, which can be varied as shown in FIGS. 9-12. While it may be desirable to form all knobs 30 on a single tire 10 with uniform dimensions, it is contemplated that a tire 10 may include knobs of differing lengths, widths and heights, even within a knob group 32. As examples and not by way of limitations, the length 37 and/or width 38 of each knob may be less than 10% of the tire width "W", and more preferably less than 5% of the tire width 26.

For example, where a tire width 26 is 50 mm, each knob 30 would have a length or width less than 5 mm, and more preferably, less than 2.5 mm. In the case of an automobile tire, such as that shown in FIG. 13, the tire width 26g may be 220 mm, for example, in which case each knob 30 would have a length or width less than 22 mm, and more preferably, less than 11 mm. In the case of a tire for a large tractor, truck or heavy duty vehicle, such as that shown in FIG. 14, the tire width 26g may be 700 mm, for example, in which case each knob 30 would have a length or width less than 70 mm, and more preferably, less than 35 mm.

In the same manner, the length 37 and/or width 38 of the knob 30 may also be less than 1% of the tire circumference "C," and more preferably less than 0.15% of the tire circumference. Thus, it will be appreciated that the size of the knobs are very small in relation to the size of the tire as defined in proportion to the tire's width and/or circumference.

Where the tire 10 is adapted for use with bicycles, the length 37 and width 38 of the knob 30 are each preferably less than 2 mm, and the height is at least 0.4 mm. In a preferred embodiment, the length, width and spacing between knobs may be 2 mm or less even where the tire 10 is configured for use with anything other than a bicycle (e.g., vehicles).

In terms of spacing, each knob 30 may be attached or detached from adjacent knobs 30. Where adjacent knobs are detached, the spacing between adjacent knobs are preferably no more than 10% of the tire width W, and more preferably no more than 4% of the tire width W. Alternatively, the spacing between adjacent knobs may be no more than 1% of the tire circumference 22, and preferably no more than 0.12% of the tire circumference 22. Where the tire 10 is adapted for use with bicycles, the spacing between adjacent detached knobs 30 are preferably no more than a distance of 2 mm.

The knobs 30 may be attached to, or detached from, each other. As shown in FIG. 1, transverse rows of attached knobs and detached knobs may be arranged in an alternating pattern to form a matrix that comprises the group 32. When detached, a knob 30 comprises an individual member separate from adjacent knobs 30. When attached as shown in the first preferred embodiment in FIG. 1, an array or matrix of attached knobs 30 may be formed in any desired geometric line or shape. In FIG. 1, the knob group 32 comprises, for example, three rows of detached knobs and three rows of attached knobs 30, each row forming a straight line extending across the tire width 26. It is contemplated that attached knobs 32 may be formed into curved lines and a variety of other lines and shapes.

Even when attached to each other, each knob 30 is preferably distinguishable from other joined knobs 30 in that each knob 30 forms a distinct shape and structure (e.g. circular, square, triangular, etc.) that is preferably repeated with all the knobs 30 in the attached array.

FIG. 2 is a top plan view of the first preferred embodiment. In each knob group 32, a slight gap 43 is disposed between the recess wall 41, or border, and the adjacent knobs 32. A pair of grooves 50 are in fluid communication with each recess 34 and configured to direct any fluids away from the recess and ultimately away from the tire 10. Grooves 50 helps to channel fluid away from knobs 30 to enhance tread-to-surface/terrain contact when the tire rolling over wet surface/terrain.

It will be appreciated that knob groups 32 may be formed with variations in spacing between knobs, spacing between knobs and recess walls, knob heights, attached versus detached knobs, and shapes and dimensions of recesses.

Figure 4:
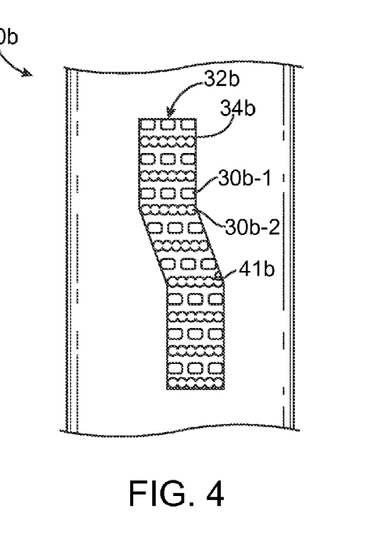
FIG. 4 is top plan view of a second preferred embodiment of a tire.

FIG. 4 shows a second preferred embodiment of a tire 10*b* where elements of similar structure are designated by the same reference numerals followed by the lower case "b." A knob group 32*b* comprises a combination of detached, individual knobs 30*b*-1 having a first shape and attached knobs 30*b*-2 having a different, second shape. The detached individual knobs 30*b*-1 are closely spaced to adjacent knobs in the preferred range of distances discussed above and may be arranged in rows or any other desired configuration. In the second preferred embodiment, preferably no gap is formed between the recess walls 41*b* and adjacent knobs 30*b*-1, 30*b*-2. In the illustrated embodiment in FIG. 4, the recess 34*b* comprise an asymmetrical, elongate shape.

Figure 5:
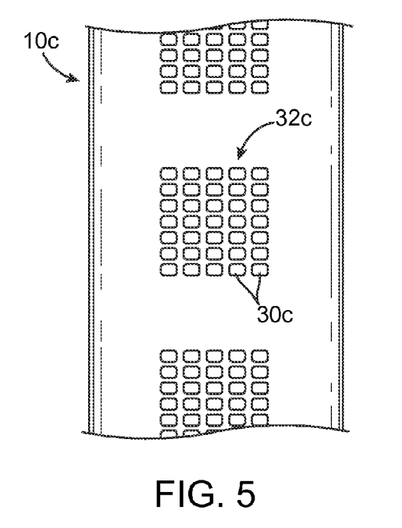
FIG. 5 is a top plan view of a third preferred embodiment of a tire.

In FIG. 5 where elements of similar structure are designated by the same reference numerals followed by the lower case "c," a tire 10*c* does not comprise any recesses. The tire 10*c* may simply comprise groups 32*c* of closely positioned knobs 30*c*, shown detached in this embodiment.

Figure 6:
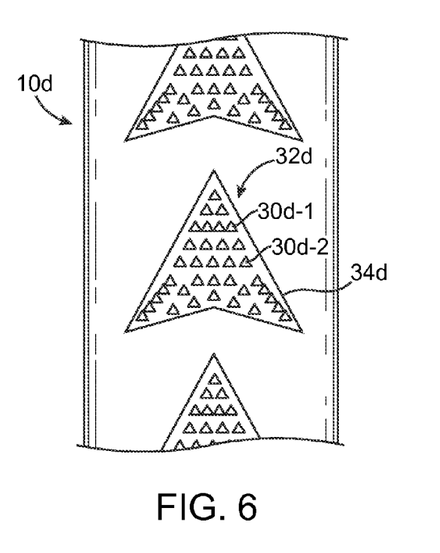
FIG. 6 is a top plan view of a fourth preferred embodiment of a tire.

In FIG. 6 where elements of similar structure are designated by the same reference numerals followed by the lower case "d," a tire 10*d* comprises at least one knob group 32*d* including both attached knobs 30*d*-1 and detached knobs 30*d*-2 in a random pattern. The knobs 30*d*-1, 30*d*-2 may be formed into a limitless variety of shapes, e.g., triangular knobs as shown in FIG. 6. The recess 34*d* may also be formed into a limitless variety of shapes and dimensions.

Similarly, the knobs 30 in the illustrated embodiment in FIG. 6, the recess 34*d* has a generally triangular shape.

Figure 7:
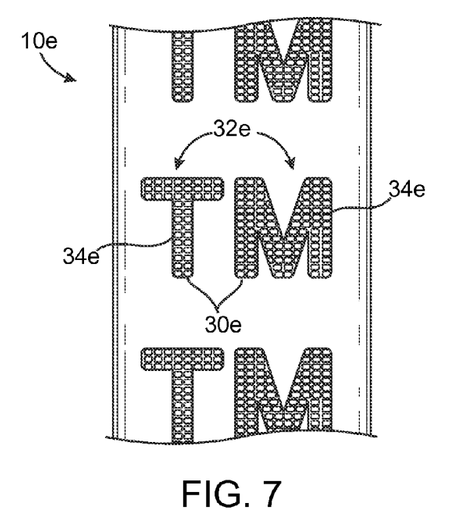
FIG. 7 is a top plan view of a fifth preferred embodiment of a tire.

In FIG. 7 where elements of similar structure are designated by the same reference numerals followed by the lower case "e," a tire 10*e* may comprise a configuration of knobs 30*e* within a group 32*e* so as to form letters, numbers, symbols, graphics and/or images. Each group 32*e* contained within a corresponding recess 34*e* may repeat the same marking or show different markings. Therefore, a way to market and brand product is provided according to the invention. For example, a company can employ configurations of recess and knob groups to identify their brand on the tire.

Figure 8:
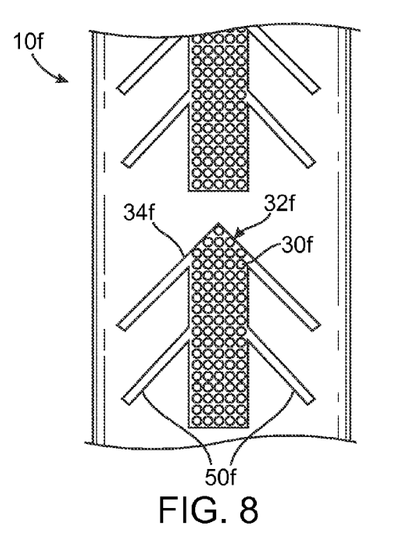
FIG. 8 is a top plan view of a sixth preferred embodiment of a tire.

In FIG. 8 where elements of similar structure are designated by the same reference numerals followed by the lower case "f," a tire 10*f* comprises groups 32*f* of knobs 30*f* disposed in corresponding recesses 34*f*, each forming an image or graphic, which in this illustrated embodiment comprises a tree or arrowhead, for example. The grooves 50*f* in fluid communication with each recess 34*f* can assist in forming the graphic design or artwork.

FIGS. 9-12 illustrate varying the heights of knobs contained within a tire recess and/or varying the depth of the recess in order to create the desired position of the tops of the knobs in relation to the outer circumferential surface 20 of the tire 10. FIGS. 8-11 each illustrate a recess 34 having a recess base 52 and a recess wall 41, with the distance between the base 52 and the ledge 54 of the recess wall 41 defining a depth 56 of the recess 34. In the preferred embodiment, the knob height is 0.4 mm or greater. Such a preferred height allows each knob to deflect and/or deform to add sufficient friction or affect hysteresis in a meaningful way.

Figure 9:
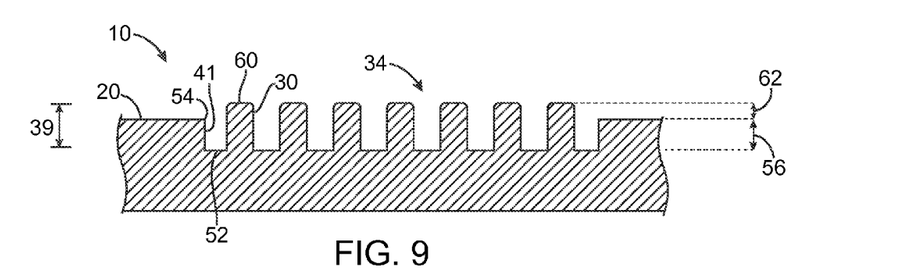
FIG. 9 is a cross-sectional view of a group of tire knobs protruding above or beyond the recess height.

In FIG. 9, each knob 30 has a knob height 39 greater than the recess depth 56 such that the knob top 60 protrudes a distance 62 radially outwardly beyond the ledge 54.

Figure 10:
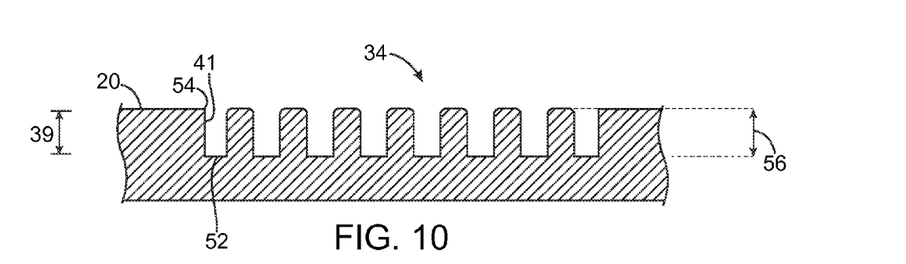
FIG. 10 is a cross-sectional view of a group of tire knobs with a height that is flush with the recess depth.

In FIG. 10, the knob height 39 is substantially equivalent to the recess depth 56 such that the knob tops 60 are substantially flush with the ledge 56.

Figure 11:
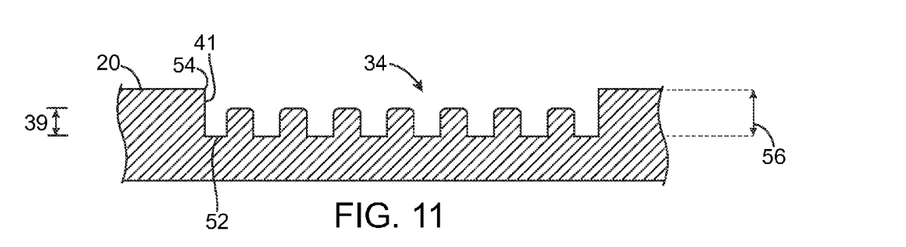
FIG. 11 is a cross-sectional view of a group of tire knobs with a height that is less than the recess depth.

In FIG. 11, the knob height 39 is less than the knob depth 56 such that the knob tops 60 lie beneath the ledge 56. It will be appreciated that the shorter configuration of knobs in FIG. 11 will generate less resistance than the flush configuration of FIG. 10 which generates less resistance than the protruding configuration of FIG. 9.

Figure 12:
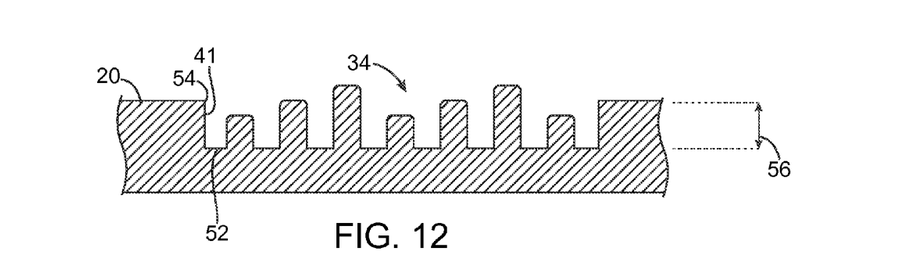
FIG. 12 is a cross-sectional view of a group of knobs having varying heights that are greater than, less than and equivalent to the recess depth.

FIG. 12 illustrates a knob group 32 disposed within a recess 34 having knobs 30-1, 30-2 and 30-3 of varying heights. For example, a first knob 30-1 has a shortest height 39-1 such that its knob top 60-1 lies beneath the ledge 54. A second knob 30-2 has a middle height 39-2 such its knob top 60-2 is substantially flush with the ledge 54. A third knob 30-3 has the greatest height 39-3 such its knob top 60-3 protrudes beyond the ledge 54.

Figure 13:
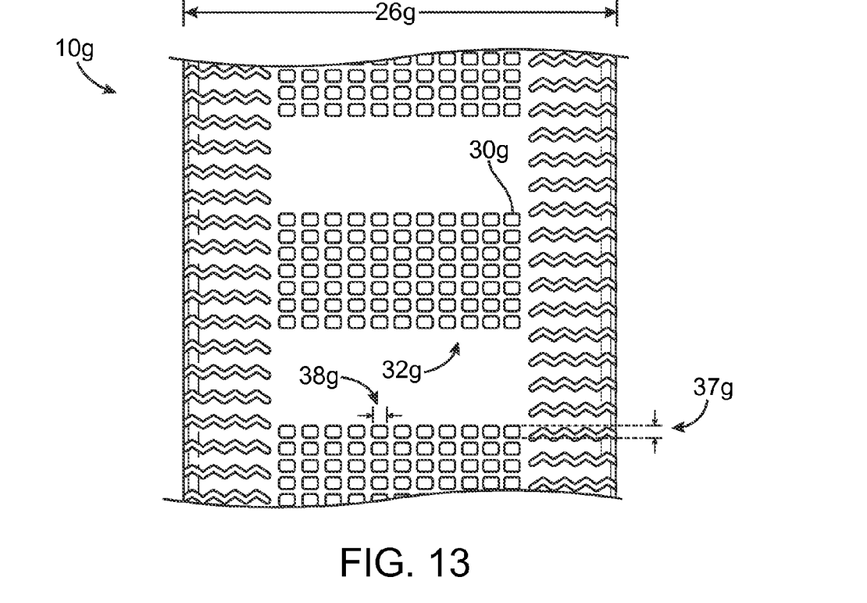
FIG. 13 is a top plan view of a preferred embodiment of an automobile tire.

FIG. 13 illustrates a preferred embodiment of a tire 10*g* configured for use with automobiles, where elements of similar structure are designated by the same reference numerals followed by the lower case "g." The tire 10*g* has a tire width 26*g* that is substantially wider than the bicycle tire shown in FIGS. 1-3. This car tire 10*g* preferably omits recesses and comprises groups 32*g* of knobs 30*g*.

Each knob 30*g* has a length or width that is preferably less than 10% of the tire width 26*g*, and even more preferably less than 5% of the tire width 26*g*. The length 37*g* and/or width 38*g* of the knob 30*g* is also preferably less than 1% of the tire circumference, and more preferably less than 0.15% of the tire circumference.

Figure 14:
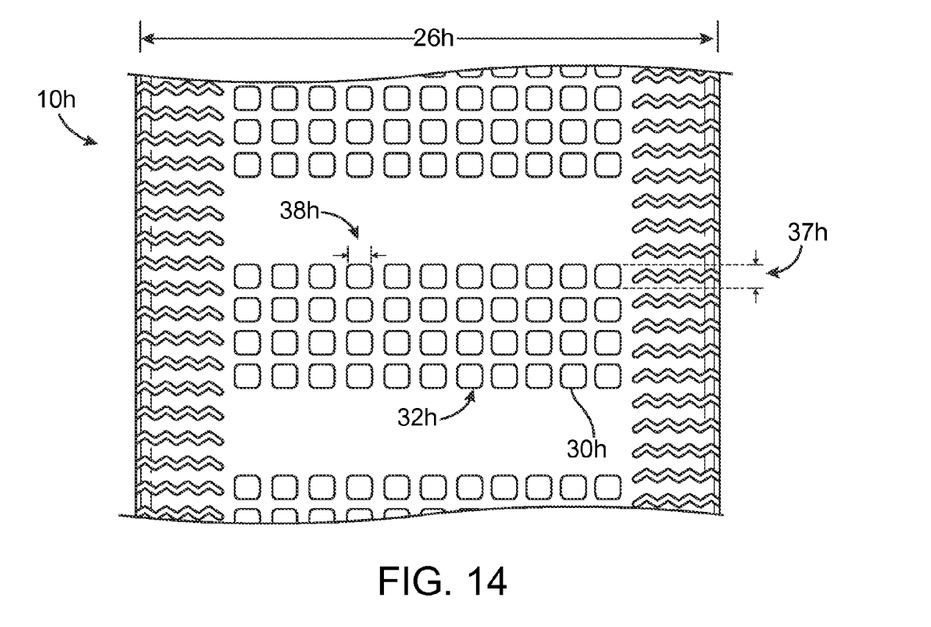
FIG. 14 is a top plan view of a preferred embodiment of a tire for large tractors, trucks, and heavy duty vehicles.

FIG. 14 illustrates a preferred embodiment of a very large tire 10h configured for use with tractors, trucks, heavy duty vehicle, where elements of similar structure are designated by the same reference numerals followed by the lower case "h." The tire 10h has a tire width 26h that is even wider than the car tire shown in FIG. 12. This giant tire 10h preferably omits recesses and comprises groups 32h of knobs 30h, which may be formed adjacent to grooves 70 and other forms of tire tread. Each knob 30h has a length or width that is preferably less than 10% of the tire width 26h, and even more preferably less than 5% of the tire width 26h. The length 37h and/or width 38h of the knob 30h is also preferably less than 1% of the tire circumference, and more preferably less than 0.15% of the tire circumference.

It will be understood that the manufacturing process of tires may involve multiple molds to form a single tire, which may result in a circumferential "flash" effect on the outer surface of the finished product where the molds abutted. Therefore, this flash effect could result in lines disposed around the tire and on top of any recesses and/or knobs.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A tire, comprising:
    a plurality of knobs each having a knob length and a knob width, one of the knob length and knob width being less than 2 mm;
    a recess including a recess base and a recess sidewall with a top ledge, the recess defining a depth extending from the base to the ledge, the plurality of knobs being disposed in the recess, the recess comprising a space indented into a tire outer surface, the depth being uniform throughout a widthwise cross-section of the recess; and
    a groove in fluid communication with the recess that is configured to capture and direct liquid away from the recess, the recess bordered by a recess perimeter that forms a closed loop broken only by the groove,
    wherein all knobs within the recess are positioned no more than a distance of 2 mm from each other; and
    wherein each of the plurality of knobs has exterior side portions extending perpendicular from the recess base.

2. The tire of claim 1, wherein:
    at least one of the plurality of knobs has a top surface that protrudes beyond the ledge.

3. The tire of claim 1, wherein:
    the plurality of knobs has a top surface that is substantially flush with the ledge.

4. The tire of claim 1, wherein:
    at least one of the plurality of knobs has a top surface that lies beneath the ledge.

5. The tire of claim 1, wherein:
    at least one of the plurality of knobs has a first top surface that protrudes beyond the ledge; and
    at least one of the plurality of knobs has a second top surface that lies beneath the ledge.

6. The tire of claim 1, wherein:
    at least one of the plurality of knobs are positioned against the recess wall.

7. The tire of claim 1, wherein at least one set of adjacent ones of the plurality of knobs is attached to each other.

8. The tire of claim 1, wherein at least one set of adjacent ones of the plurality of knobs is separate from each other.

9. The tire of claim 1, further comprising a tire width, and wherein:
    the plurality of knobs has a cross-dimension less than 5% of the tire width.

10. The tire of claim 1, further comprising a tire circumference, and wherein:
    the plurality of knobs has a cross-dimension less than 0.15% of the tire circumference.

11. A tire, comprising:
    a tire width;
    a recess having a recess base, a top ledge and a recess sidewall that forms a loop, the recess defining a depth extending from the top ledge to the recess base, the depth being uniform throughout a widthwise cross-section of the recess; and
    a plurality of knobs disposed in the recess, a first knob of the plurality of knobs having a first knob width and a first knob length, the first knob having exterior side portions extending perpendicular from the recess base, wherein all knobs within the recess are positioned no more than a distance of 2 mm from each other; and
    a groove in fluid communication with the recess that is configured to capture and direct liquid away from the recess, the recess bordered by a recess perimeter that forms a closed loop broken only by the groove,
    wherein one of the first knob width and first knob length is less than 5% of the tire width.

12. The tire of claim 11, further comprising a second knob disposed in the recess, and wherein:
    the second knob comprises a second knob width and a second knob length; and the first and second knobs are positioned no more than a distance of 5% of the tire width from each other.

13. The tire of claim 12, wherein the first knob is attached to the second knob.

14. The tire of claim 12, wherein the first knob is separate from the second knob.

15. The tire of claim 12, wherein:
the first knob has a first cross-dimension less than 2 mm; and
the second knob has a second cross-dimension less than 2 mm.

16. The tire of claim 12, further comprising a tire circumference, and wherein:
one of the first knob length and first knob width is less than 0.15% of the tire circumference; and
one of the second knob length and second knob width is less than 0.15% of the tire circumference.

17. A tire, comprising:
a tire circumference;
a plurality of knobs having a knob length and a knob width, one of the knob length and the knob width being less than 0.15% of the tire circumference;
a recess having a recess base, a top ledge and a recess sidewall that forms a loop, the recess defining a depth extending from the top ledge to the recess base, the depth being uniform throughout a widthwise cross-section of the recess; and
a groove in fluid communication with the recess that is configured to capture and direct liquid away from the recess, the recess bordered by a recess perimeter that forms a closed loop broken only by the groove;
wherein the plurality of knobs are positioned no more than a distance 0.12% of the tire circumference from each other and disposed in the recess;
wherein the plurality of knobs has exterior side portions extending perpendicular from the recess base; and
wherein at least a portion of the plurality of knobs is disposed in a pattern in the recess.

18. The tire of claim 17, wherein a first knob of the plurality of knobs is attached to a second knob of the plurality of knobs.

19. The tire of claim 17, wherein a first knob of the plurality of knobs is separate from a second knob of the plurality of knobs.

20. The tire of claim 17, wherein:
one of the knob length and knob width is less than 2 mm.

21. The tire of claim 17, further comprising a tire width, and wherein:
one of the knob length and knob width is less than 5% of the tire width.

22. A tire, comprising:
an outer circumference;
a tire width;
a plurality of knobs having a length less than 2.5 mm, a width less than 2.5 mm, and a height greater than 0.4 mm; and
a recess having a recess base, a top ledge and a recess sidewall that forms a closed loop, the recess defining a depth extending from the top ledge to the recess base, the depth being uniform throughout a widthwise cross-section of the recess; and
a groove in fluid communication with the recess that is configured to capture and direct liquid away from the recess, the recess bordered by a recess perimeter that forms a closed loop broken only by the groove;
wherein the plurality of knobs is disposed in the recess and the plurality of knobs has exterior side portions extending perpendicular from the recess base.

23. The tire of claim 22, wherein the plurality of knobs is positioned no more than a distance 0.12% of the tire circumference from each other.

\* \* \* \* \*